(12) United States Patent  
Gray et al.

(10) Patent No.: US 7,934,227 B2
(45) Date of Patent: *Apr. 26, 2011

(54) METHODS AND SYSTEMS FOR CAPTURING COMMANDS

(75) Inventors: James Harold Gray, Ellijay, GA (US); Thomas Jefferson Brothers, Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,828

(22) Filed: Sep. 28, 2009

(65) Prior Publication Data

US 2010/0083298 A1 Apr. 1, 2010

Related U.S. Application Data

(63) Continuation of application No. 10/735,309, filed on Dec. 12, 2003, now Pat. No. 7,617,508.

(51) Int. Cl.
H04N 7/173 (2011.01)
H04H 60/32 (2008.01)
H04H 60/33 (2008.01)

(52) U.S. Cl. ............. 725/14; 725/9; 725/13; 725/105; 725/120

(58) Field of Classification Search .......... 725/9, 12, 725/14, 34, 35
See application file for complete search history.

(56) References Cited

U.S. PATENT DOCUMENTS

| 677,209 | A | 6/1901 | Chernock et al. |
|---|---|---|---|
| 3,798,610 | A | 3/1974 | Bliss et al. |
| 3,886,302 | A | 5/1975 | Kosco |
| 4,130,833 | A | 12/1978 | Chomet |
| 4,258,386 | A | 3/1981 | Cheung |
| 4,361,851 | A | 11/1982 | Asip et al. |
| 4,488,179 | A | 12/1984 | Kruger et al. |
| 4,566,030 | A | 1/1986 | Nickerson et al. |
| 4,567,591 | A | 1/1986 | Gray et al. |
| 4,598,288 | A | 7/1986 | Yarbrough et al. |
| 4,602,279 | A | 7/1986 | Freeman |
| 4,688,248 | A | 8/1987 | Tomizawa |
| 4,689,661 | A | 8/1987 | Barbieri et al. |
| 4,697,209 | A | 9/1987 | Kiewitt et al. |
| 4,698,670 | A | 10/1987 | Matty |
| 4,720,873 | A | 1/1988 | Goodman et al. |
| 4,816,904 | A | 3/1989 | McKenna et al. |

(Continued)

FOREIGN PATENT DOCUMENTS

| EP | 0 424 648 | 2/1991 |
|---|---|---|
| EP | 1 162 840 | 12/2001 |
| WO | WO 94 17609 | 8/1994 |

(Continued)

OTHER PUBLICATIONS www.actv.com, Screen Print, Oct. 8, 2000.

(Continued)

*Primary Examiner* — Dominic D Saltarelli
(74) *Attorney, Agent, or Firm* — Scott P. Zimmerman PLLC

(57) ABSTRACT

Methods and systems capture user commands. A user command is received at a viewer's appliance. A determination is made whether the user command is automatically locally stored in memory of the viewer appliance. A look-up is performed when the user command is not automatically locally stored in the viewer appliance to determine if local storage is require. When the look-up determines that local storage is required, then the user command is captured and locally stored for execution at the viewer appliance. When the look-up determines that local storage is not required, then the user command is forwarded to a remote location for remote storage in a network.

20 Claims, 7 Drawing Sheets

U.S. PATENT DOCUMENTS

| | | |
|---|---|---|
| 4,885,632 A | 12/1989 | Mabey et al. |
| 4,890,322 A | 12/1989 | Russell, Jr. |
| 4,912,552 A | 3/1990 | Allison |
| 5,010,585 A | 4/1991 | Garcia |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,173,900 A | 12/1992 | Miller et al. |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | VonKohorn |
| 5,251,324 A | 10/1993 | McMullan |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,382,970 A | 1/1995 | Kiefl |
| 5,389,964 A | 2/1995 | Oberle |
| 5,404,393 A | 4/1995 | Remillard |
| 5,410,326 A | 4/1995 | Goldstein |
| 5,410,344 A | 4/1995 | Graves |
| 5,440,334 A | 8/1995 | Walters et al. |
| 5,446,490 A | 8/1995 | Blahut et al. |
| 5,446,919 A | 8/1995 | Wilkins |
| 5,481,294 A | 1/1996 | Thomas et al. |
| 5,497,185 A | 3/1996 | Dufresne et al. |
| 5,500,681 A | 3/1996 | Jones |
| 5,504,519 A | 4/1996 | Remillard |
| 5,534,911 A | 7/1996 | Levitan |
| 5,537,143 A | 7/1996 | Steingold et al. |
| 5,559,548 A | 9/1996 | Davis et al. |
| 5,579,124 A | 11/1996 | Aijala et al. |
| 5,585,838 A | 12/1996 | Lawler et al. |
| 5,585,865 A | 12/1996 | Amano et al. |
| 5,589,892 A | 12/1996 | Knee et al. |
| 5,596,994 A | 1/1997 | Bro |
| 5,600,364 A | 2/1997 | Hendricks |
| 5,600,366 A | 2/1997 | Schulman |
| 5,606,359 A | 2/1997 | Youden et al. |
| 5,608,448 A | 3/1997 | Smoral et al. |
| 5,619,247 A | 4/1997 | Russo |
| 5,630,119 A | 5/1997 | Aristides |
| 5,659,350 A | 8/1997 | Hendricks |
| 5,661,516 A | 8/1997 | Carles |
| 5,721,827 A | 2/1998 | Logan |
| 5,724,521 A | 3/1998 | Dedrick |
| 5,724,525 A | 3/1998 | Beyers, II et al. |
| 5,724,607 A | 3/1998 | Brandt |
| 5,752,159 A | 5/1998 | Faust et al. |
| 5,754,939 A | 5/1998 | Herz |
| 5,758,257 A | 5/1998 | Herz et al. |
| 5,758,259 A | 5/1998 | Lawler |
| 5,774,170 A | 6/1998 | Hite et al. |
| 5,778,182 A | 7/1998 | Cathey et al. |
| 5,794,210 A | 8/1998 | Goldhaber et al. |
| 5,796,952 A | 8/1998 | Davis et al. |
| 5,798,785 A | 8/1998 | Hendricks et al. |
| 5,809,481 A | 9/1998 | Baron et al. |
| 5,818,438 A | 10/1998 | Howe |
| 5,838,314 A | 11/1998 | Neel |
| 5,848,396 A | 12/1998 | Gerace |
| 5,848,397 A | 12/1998 | Marsh et al. |
| 5,850,249 A | 12/1998 | Massetti et al. |
| 5,854,897 A | 12/1998 | Radziewicz et al. |
| 5,861,906 A | 1/1999 | Dunn et al. |
| 5,867,226 A | 2/1999 | Wehmeyer et al. |
| 5,872,588 A | 2/1999 | Aras et al. |
| 5,892,508 A | 4/1999 | Howe |
| 5,892,536 A | 4/1999 | Logan |
| 5,917,481 A | 6/1999 | Rzeszewski |
| 5,945,988 A | 8/1999 | Williams et al. |
| 5,948,061 A | 9/1999 | Merriman et al. |
| 5,973,683 A | 10/1999 | Cragun |
| 5,983,227 A | 11/1999 | Nazem |
| 5,991,735 A | 11/1999 | Gerace |
| 5,991,799 A | 11/1999 | Yen et al. |
| 6,002,393 A | 12/1999 | Hite |
| 6,005,597 A | 12/1999 | Barrett |
| 6,026,368 A | 2/2000 | Brown et al. |
| 6,029,045 A | 2/2000 | Picco et al. |
| 6,029,195 A | 2/2000 | Herz |
| 6,076,094 A | 6/2000 | Cohen |
| 6,081,840 A | 6/2000 | Zhao |
| 6,100,916 A | 8/2000 | August |
| 6,119,098 A | 9/2000 | Guyot et al. |
| 6,128,009 A | 10/2000 | Ohkura et al. |
| 6,134,531 A | 10/2000 | Trewitt et al. |
| 6,160,570 A | 12/2000 | Sitnik |
| 6,172,674 B1 | 1/2001 | Ethridge |
| 6,177,931 B1 | 1/2001 | Alexander et al. |
| 6,185,614 B1 | 2/2001 | Cuomo |
| 6,202,210 B1 | 3/2001 | Ludtke |
| 6,226,618 B1 | 5/2001 | Downs et al. |
| 6,236,975 B1 | 5/2001 | Boe et al. |
| 6,252,586 B1 | 6/2001 | Freeman et al. |
| 6,279,157 B1 | 8/2001 | Takasu |
| 6,282,713 B1 | 8/2001 | Kitsukawa |
| 6,286,042 B1 | 9/2001 | Hasselberg et al. |
| 6,314,568 B1 | 11/2001 | Ochiai |
| 6,314,577 B1 | 11/2001 | Pocock |
| 6,327,574 B1 | 12/2001 | Kramer et al. |
| 6,345,256 B1 | 2/2002 | Milsted et al. |
| 6,353,929 B1 | 3/2002 | Houston |
| 6,397,057 B1 | 5/2002 | Malackowski et al. |
| 6,400,408 B1 | 6/2002 | Berger |
| 6,408,437 B1 | 6/2002 | Hendricks et al. |
| 6,434,747 B1 | 8/2002 | Khoo et al. |
| 6,446,261 B1 | 9/2002 | Rosser |
| 6,457,010 B1 | 9/2002 | Eldering |
| 6,463,468 B1 | 10/2002 | Buch |
| 6,463,585 B1 | 10/2002 | Hendricks et al. |
| 6,477,704 B1 | 11/2002 | Cremia |
| 6,487,538 B1 | 11/2002 | Gupta et al. |
| 6,496,818 B1 | 12/2002 | Ponte |
| 6,505,348 B1 | 1/2003 | Knowles |
| 6,507,839 B1 | 1/2003 | Ponte |
| 6,510,417 B1 | 1/2003 | Woods et al. |
| 6,530,082 B1 | 3/2003 | DelSesto et al. |
| 6,631,360 B1 | 10/2003 | Cook |
| 6,647,548 B1 | 11/2003 | Lu et al. |
| 6,675,383 B1 | 1/2004 | Wheeler et al. |
| 6,698,020 B1 | 2/2004 | Zigmond et al. |
| 6,714,992 B1 | 3/2004 | Kanojia et al. |
| 6,718,551 B1 | 4/2004 | Swix |
| 6,757,691 B1 | 6/2004 | Welsh et al. |
| 6,766,524 B1 | 7/2004 | Matheny et al. |
| 6,810,527 B1 | 10/2004 | Conrad et al. |
| 6,845,396 B1 | 1/2005 | Kanojia et al. |
| 6,850,988 B1 | 2/2005 | Reed |
| 6,950,804 B2 | 9/2005 | Strietzel |
| 6,970,641 B1 | 11/2005 | Pierre |
| 6,976,268 B2 | 12/2005 | Courtney |
| 6,983,478 B1 | 1/2006 | Grauch |
| 7,000,245 B1 | 2/2006 | Pierre |
| 7,010,492 B1 | 3/2006 | Bassett et al. |
| 7,020,336 B2 | 3/2006 | Cohen-Solal |
| 7,020,652 B2 | 3/2006 | Matz |
| 7,039,599 B2 | 5/2006 | Merriman |
| 7,039,932 B2 | 5/2006 | Eldering |
| 7,086,075 B2 | 8/2006 | Swix |
| 7,212,979 B1 | 5/2007 | Matz |
| 7,260,823 B2 | 8/2007 | Schlack et al. |
| 7,269,835 B2 | 9/2007 | Swix |
| 7,441,260 B1 | 10/2008 | Kurapati |
| 7,444,658 B1 | 10/2008 | Matz |
| 7,587,323 B2 | 9/2009 | Matz |
| 7,593,858 B2 | 9/2009 | Matz |
| 7,617,508 B2 | 11/2009 | Gray |
| 7,661,118 B2 | 2/2010 | Matz |
| 2001/0004733 A1 | 6/2001 | Eldering |
| 2002/0016964 A1 | 2/2002 | Aratani et al. |
| 2002/0032906 A1 | 3/2002 | Grossman |
| 2002/0035600 A1 | 3/2002 | Ullman et al. |

| | | |
|---|---|---|
| 2002/0046099 A1 | 4/2002 | Frengut et al. |
| 2002/0049631 A1 | 4/2002 | Williams |
| 2002/0049967 A1 | 4/2002 | Haseltine et al. |
| 2002/0056109 A1 | 5/2002 | Tomsen |
| 2002/0056118 A1 | 5/2002 | Hunter et al. |
| 2002/0078443 A1 | 6/2002 | Gadkari et al. |
| 2002/0083441 A1 | 6/2002 | Flickinger et al. |
| 2002/0087573 A1 | 7/2002 | Reuning et al. |
| 2002/0092017 A1 | 7/2002 | Klosterman et al. |
| 2002/0100064 A1 | 7/2002 | Ward et al. |
| 2002/0123928 A1 | 9/2002 | Eldering et al. |
| 2002/0133817 A1 | 9/2002 | Markel |
| 2002/0143647 A1 | 10/2002 | Headings |
| 2002/0157108 A1 | 10/2002 | Kitsukawa et al. |
| 2002/0157109 A1 | 10/2002 | Nakano et al. |
| 2002/0169709 A1 | 11/2002 | Kitayama |
| 2002/0199197 A1 | 12/2002 | Winter |
| 2003/0028432 A1 | 2/2003 | Troyansky et al. |
| 2003/0028873 A1 | 2/2003 | Lemmons |
| 2003/0067554 A1 | 4/2003 | Klarfeld |
| 2003/0093792 A1 | 5/2003 | Labeeb et al. |
| 2003/0110489 A1 | 6/2003 | Gudorf et al. |
| 2003/0110497 A1 | 6/2003 | Yassin et al. |
| 2003/0149975 A1 | 8/2003 | Eldering et al. |
| 2003/0172374 A1 | 9/2003 | Vinson et al. |
| 2004/0133467 A1 | 7/2004 | Siler |
| 2004/0163101 A1 | 8/2004 | Swix |
| 2004/0193483 A1 | 9/2004 | Wolan |
| 2004/0194131 A1 | 9/2004 | Ellis et al. |
| 2004/0261127 A1 | 12/2004 | Freeman et al. |
| 2005/0060759 A1 | 3/2005 | Rowe et al. |
| 2005/0071863 A1 | 3/2005 | Matz |
| 2005/0132419 A1 | 6/2005 | Gray |
| 2005/0137958 A1 | 6/2005 | Huber et al. |
| 2005/0235318 A1 | 10/2005 | Grauch |
| 2005/0251820 A1 | 11/2005 | Stefanik |
| 2005/0278741 A1 | 12/2005 | Robarts et al. |
| 2005/0283401 A1 | 12/2005 | Swix |
| 2005/0283792 A1 | 12/2005 | Swix |
| 2006/0031882 A1 | 2/2006 | Swix |
| 2006/0075456 A1 | 4/2006 | Gray |
| 2006/0253884 A1 | 11/2006 | Gray |
| 2006/0271438 A1 | 11/2006 | Shotland et al. |
| 2006/0288367 A1 | 12/2006 | Swix |
| 2007/0226761 A1 | 9/2007 | Zalewski et al. |
| 2007/0250846 A1 | 10/2007 | Swix |
| 2007/0255622 A1 | 11/2007 | Swix |
| 2008/0004962 A1 | 1/2008 | Muthukrishnan et al. |
| 2008/0104634 A1 | 5/2008 | Gajdos et al. |
| 2008/0147497 A1 | 6/2008 | Tischer |
| 2008/0148311 A1 | 6/2008 | Tischer |
| 2008/0263586 A1 | 10/2008 | Thomas |
| 2009/0292703 A1 | 11/2009 | Matz |
| 2010/0083298 A1 | 4/2010 | Gray |
| 2010/0100435 A1 | 4/2010 | Matz |

FOREIGN PATENT DOCUMENTS

| | | |
|---|---|---|
| WO | WO 96 07270 | 3/1996 |
| WO | WO 98 31114 | 7/1998 |
| WO | WO 99 04561 | 1/1999 |
| WO | WO 99 45702 | 10/1999 |
| WO | WO 99 52285 | 10/1999 |
| WO | WO 0147156 | 6/2001 |

OTHER PUBLICATIONS

"ACTV, Inc. Offers Exclusive Preview of 'Individualized Television' at Official All-Star Café," Business Wire, Sep. 16, 1998.

"ACTV's HyperTV & 'Individualized Television' to be Powered by Sun Microsystems' JavaTV Technology," Business Wire, Apr. 21, 1999.

Whitaker, Jerry, "Interactive TV: Killer Ap or Technical Curiosity?", Broadcast Engineering, Dec. 1999.

Dickson, Glen, "Digital TV gets specifically directed," Broadcasting & Cable, Jun. 5, 2000.

Reed, David, "The future is digital," Precision Marketing, v. 13, n.51, p. 27, Sep. 21, 2001.

Wasserman, Todd, "Mining Everyone's Business." Brandweek, Feb. 28, 2000. 19 pages.

Cauley, Leslie, "Microsoft, Baby Bell Form Video Alliance," *The Wall Street Journal*, Sep. 26, 1994.

"allNetDevices:—Report: Interactive TV Soon to Become Direct Marketing Tool," allNetDevices, www.devices.internet.com/com_cgi/print/print.cgi?url=http://devices.../report_interactive.html, (Nov. 16, 2001) pp. 1-2.

"Liberate Technologies—Solutions," Digital Cable Two-Way, www.solutions.liberate.com/architecture/dc2.html, (Nov. 16, 2001) p. 1 of 1.

"Liberate Technologies—Solutions," Digital Broadband Telco, www.solutions.liberate.com/architecture/db.html, (Nov. 16, 2001) p. 1 of 1.

"Liberate Technologies—Solutions," Liberate Connect Suite, www.solutions.liberate.com/products/connect_suite.html, (Nov. 16, 2001) pp. 1-2.

"Liberate Technologies—Solutions," Liberate imprint Server™, www.solutions.liberate.com/products/imprint_server.html, (Nov. 16, 2001) p. 1 of 1.

"Liberate Technologies—Solutions," Liberate Mediacast Server™, www.solutions.liberate.com/products/mediacast_server.html, (Nov. 16, 2001) pp. 1-2.

"Spike High Performance Server Array," Mixed Signals Technologies, Inc., www.mixedsignals.com, itvinfo@mixedsignals.com (2000) p. 1.

"Power, flexibility, and control," RespondTV, www.respondtv.com/whyrespond.html (Nov. 16, 2001) pp. 1-2.

"It just clicks!," RespondTV, www.respondtv.com/inaction.html, (Nov. 16, 2001) pp. 1-2.

"The Wink System," Wink System Diagram, www.wink.com/contents/tech_diagram.html, (Nov. 16, 2001) p. 1 of 1.

"What is Wink?," www.wink.com/contents/whatiswink.html, (Nov. 16, 2001) p. 1 of 1.

"How Wink Works," What is Wink: How wink works, www.wink.com/contents/howitworks.html, (Nov. 16, 2001) p. 1 of 1.

"What is Wink: Examples," What is Wink—Examples, www.wink.com/contents/examples.html, (Nov. 16, 2001) pp. 1-2.

"Nielsen Media Research—Who We Are & What We Do," www.nielsenmedia.com/whoweare.html, (Oct. 11, 2001) pp. 1-4.

Aggarwal et al ("A Framework for the Optimizing of WWW Advertising" Proceedings of the International IFIP/GI Working Conference Trends in Distributed Systems for Electronic Commerce, pp. 1-10, Year of Publication: 1998).

U.S. Appl. No. 08/779,306, Grauch.
U.S. Appl. No. 10/017,742, Matz.
U.S. Appl. No. 12/508,653, Matz.
U.S. Appl. No. 10/017,111, Matz.
U.S. Appl. No. 10/039,062, Matz.
U.S. Appl. No. 10/020,779, Swix.
U.S. Appl. No. 12/692,040, Swix.
U.S. Appl. No. 12/642,905, Matz.

METHODS AND SYSTEMS FOR CAPTURING COMMANDS

CROSS REFERENCE TO RELATED APPLICATIONS

This application is a continuation of U.S. application Ser. No. 10/735,309, filed Dec.12, 2003, now issued as U.S. Pat. No. 7,617,508, and incorporated herein by reference in its entirety.

TECHNICAL FIELD

The present invention is related to the capture of clickstreams generated by television viewers when making television programming selections. More particularly, the present invention is related to the collaborative capture of clickstreams both locally and remotely.

BACKGROUND

When a television viewer watches television, the viewer periodically makes selections to control what is being viewed. The viewer may change to a different channel and program, may choose to channel surf during commercials, may choose to shut down the television equipment and not watch any programming during certain time periods, etc. The sequence of these user commands are known as a clickstream which provides an indication of what the viewer is or is not watching on television when the clickstream is captured in relation to time, current channel before a change, current channel after a change, etc.

Initially, this clickstream was not captured in any way. The behavior of the television viewer was not tracked, and there was no way to identify trends in the behavior of the television viewer without requiring the television viewer to become involved, such as manually recording what the viewer watches or installing special equipment in the home of the viewer specifically for the purpose of tracking what programs the viewer watched.

The introduction of set top boxes that tune in broadcasted channels for the viewer gave rise to a way to track the television watching behavior of the viewer without requiring the viewer to become involved. The set top box receives multiple streams of television programming and executes the commands from the viewer such as channel changes to control which stream is being viewed by the viewer. The set top box may also be provided with clickstream capture functionality so that when the set top box receives a user command, the command is captured and stored within the set top box in addition to being executed within the set top box. In this way, the set top box effectively captures the viewing behaviors of the viewer.

The clickstream that has been captured may then be periodically forwarded from the set top box to a service provider system where it can be put to use. The service provider system may process the clickstream relative to profile information of the viewers producing the clickstreams to produce statistics about television viewing habits, such as statistics based on demographics. The service provider and/or television content providers may then utilize these statistics for various purposes. For instance, this information may be used to determine what television programming to provide to consumers.

While this set top box approach does provide the clickstream capture, it has drawbacks because for advanced television networks, some controls such as the switching between streams of programming may be performed within the television network for a viewer rather than at the set top box such that the set top box only receives a single stream at a time. Thus, the set top box may not include the intelligence to recognize the significance of one user command from another but instead simply transfers the user command to the television network for execution such that the set top box is ineffective at capturing the clickstream for these events.

SUMMARY

Embodiments of the present invention address these issues and others by providing a collaborative clickstream capture. At least some of the user commands are transferred from the premises of the viewer, such as by a set top box, to a remotely located component such as a video control system within a television network. These user commands are captured at the remotely located component and are stored remotely from the premises of the viewer. Additionally, the set top box continues to capture and store user commands as well, such as user commands that are implemented at the set top box rather than those transferred to the network.

One embodiment is a method of capturing user commands related to viewing television programming. The method involves receiving a first user command at a viewer appliance at a premises of the viewer and subsequently receiving a second user command at the first component. Information related to the first user command is stored at the viewer appliance concurrently relative to receiving the first user command. Relative to receiving the second user command, the second user command is concurrently forwarded from the viewer appliance to a component located remotely from the premises of the viewer. Information related to the second user command is stored remotely from the premises of the viewer upon receiving the second user command at the component.

Another embodiment is a method of capturing user commands related to viewing television programming. The method involves receiving a first user command at a viewer appliance at a premises of the viewer and subsequently receiving a second user command at the viewer appliance. Information related to the first user command is stored at the viewer appliance concurrently relative to receiving the first user command. The first user command is executed at the viewer appliance to alter a first aspect of the television programming being viewed by the viewer while the information related to the first user command continues to be stored at the viewer appliance. The second user command is forwarded concurrently relative to receiving the second user command from the viewer appliance to a component located remotely from the premises of the viewer. The second user command is executed at the component to alter a second aspect of the television programming being viewed by the viewer. Information related to the second user command continues to be stored upon receiving the second user command at the component after the second user command has been executed by the second component.

Another embodiment is a system for capturing user commands related to viewing television programming. The system includes a reception mechanism located at a premises of a viewer for receiving a first and a second user command. A transfer mechanism is located at the premises of the viewer for transferring the second user command concurrently relative to the reception mechanism receiving the second user command. A control mechanism executes the first and second user commands received by the reception mechanism to control aspects of the television programming being provided to the viewer. A capture mechanism is located remotely from the premises of the viewer and receives the second user command being transferred concurrently by the transfer mechanism. A first storage mechanism is located at the premises of the viewer and continues to store information related to the first user command after the first user command has been executed by the control mechanism. A second storage mechanism is located remotely from the premises of the viewer and continues to store information related to the second user command after the second user command has been executed by the control mechanism and received by the capture mechanism.

Another embodiment is a method of capturing user commands from a viewer that are related to viewing television programming. The method involves receiving the user command at a viewer appliance at the premises of the user. Upon receiving the user command, it is determined whether to store information related to the user command at the viewer appliance and the information related to the user command is stored at the viewer appliance when it is determined that the information related to the user command is to be stored at the viewer appliance. When it is determined not to store the information related to the user command at the viewer appliance, then the user command is forwarded from the viewer appliance.

Another embodiment is a method of capturing user commands from a viewer that are related to viewing television programming. The method involves receiving the user command at a viewer appliance at the premises of the viewer. Upon receiving the user command, it is determined whether to store information related to the user command at the viewer appliance and the information related to the user command is stored at the viewer appliance when it is determined that the user command is to be stored at the viewer appliance. Upon receiving the user command, it is determined whether to execute the user command at the viewer appliance and the user command is executed at the viewer appliance when it is determined that the user command is to be executed at the viewer appliance. When it is determined not to execute the user command at the viewer appliance, then the user command is forwarded from the viewer appliance.

Another embodiment is a method of capturing user commands from a viewer that are related to viewing television programming. The method involves receiving the user command at a component remotely from the premises of the viewer. Upon receiving the user command, it is determined whether to store information related to the user command remotely from the premises of the viewer and the information related to user command is stored remotely from the premises of the viewer when it is determined that the user command is to be stored remotely from the premises of the viewer. The user command is executed at the component.

Another embodiment is a method of capturing user commands from a viewer that are related to viewing television programming. The method involves receiving the user command at a component remotely from the premises of the viewer. Upon receiving the user command, the information related to the user command is stored remotely from the premises of the viewer. Upon receiving the user command, it is determined whether to execute the user command at the component and the user command is executed at the component when it is determined that the user command is to be executed at the component.

DETAILED DESCRIPTION

Embodiments of the present invention provide for the collaborative capture of clickstreams that are generated by TV viewers. With clickstream capture occurring at a remote location such as within the television network while clickstream capture is also occurring at the premises of the viewer, those user commands executed either locally or at the remote location may be captured. Furthermore, redundant clickstream capture may also be provided, such as for delivery of the captured clickstream from the local viewer appliance or other device to remote external locations.

Figure 1:
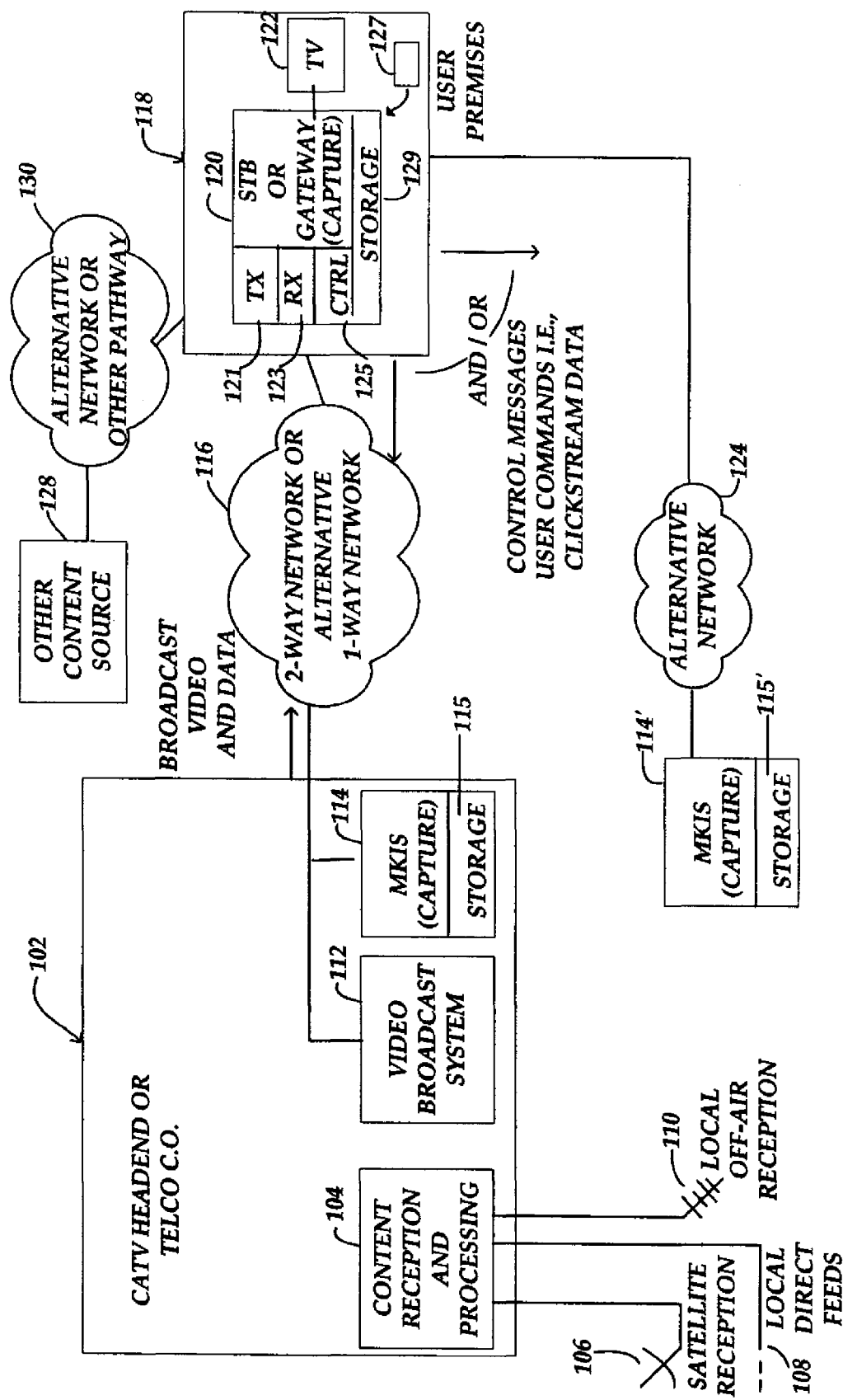
FIG. 1 shows an illustrative clickstream capture system architecture for implementing embodiments of the present invention where the television programming is broadcast to a viewer appliance that executes the user commands while some clickstream capture is performed locally and other clickstream capture is performed remotely from the viewer premises.

FIG. 1 shows one example of a system for capturing the clickstreams where the television programming that is being provided to the viewer is a broadcast system. Multiple channels of television programming are being broadcast simultaneously to the viewer appliance, which then tunes to the particular channel of programming that the viewer desires to watch. The broadcast television programming is provided to viewers from a central location 102, such as a community access television ("CATV") headend or a telephone company ("telco") central office ("CO") which may provide Internet connectivity for streaming programming to the viewer.

The central location 102 includes various components for receiving the television programming to be broadcast to the television viewers. Much of the television programming originates from a satellite reception via a satellite receiver dish 106. Additional direct local feeds 108 receive direct transmission via a wireline link to local television stations. Also, additional local off-air reception via antennas 110 may also receive local programming that is not otherwise received through the direct local feeds 108.

These programming sources provide received programming to a content reception and processing system 104. This system 104 takes the various channels of television programming being received and creates a channel line-up. The channel line-up is the distribution of the channels being provided by the service provider over the particular channels designated by the service provider. The content reception and processing system 104 receives a particular stream of programming and assigns it to a particular channel within the channel line-up.

The content reception and processing system 104 provides the individual streams of programming to a video broadcast system 112. The video broadcast system 112 then broadcasts each of the streams of programming within its assigned channel of the channel line-up. The video broadcast system 112 broadcasts these channels, as well as data such as guide data, over a distribution network 116 that feeds each of a plurality of individual television viewer premises 118. Typically, the distribution network 116 includes a network of coaxial or other lines that extend over a region being served, where each of the lines terminates at viewer premises 118.

The broadcasts may be either in an analog or a digital format. The network 116 may carry either format or both formats, such as where one set of channels of the channel line-up are broadcast as analog while another set of channels of the channel line-up are digital. Additionally, the network 116 may carry two-way communications such that communications may be provided back to the central location 102 from viewer premises 118. Alternatively, the network 116 may carry only one-way communications from the central location 102 to viewer premises 118.

In addition, there may be alternative sources of television programming to a viewer appliance 120 at viewer premises 118. An alternative source of content 128 may be provided to the viewer through an alternative network 130 such as a digital satellite connection, a digital off-air reception, etc. Thus, the viewer may select from various sources of content when providing user commands, and these user commands are captured for later processing.

At viewer premises 118, the incoming stream of channels is provided to the viewer appliance 120. The viewer appliance 120 such as a set top box or broadband gateway allows a viewer to provide commands to control aspects of the television programming being viewed, such as channel changes and/or additional aspects such as audio format and volume control. The viewer appliance typically outputs the selected channel to a television 122. The viewer appliance 120 may be a gateway in place of a set top box so as to receive user commands from different areas of the premises 118 and distribute the selected channel to televisions located in different areas as opposed to having a viewer appliance 120 at each location where a television 122 is present. It should be appreciated that the viewer appliance 120 may be incorporated into the television 122 rather than being a separate component.

When a viewer is watching television, the viewer provides user commands to control the aspects of television programming as desired. The viewer may provide a user command by pressing buttons on a remote control 127 that provides a corresponding signal to the viewer appliance 120 that is received by a reception module 123. Alternatively, the viewer may provide a user command by pressing buttons located on the viewer appliance 120 itself. The viewer appliance 120 executes the command through a control module 125 to control the television programming as desired by the viewer. In addition to executing the command, as the command is received the viewer appliance 120, the user command (i.e., a control message) may be captured and stored at the viewer appliance in storage 129 and/or the user command may be forwarded to an external location by a transfer module 121.

For example, user commands relative to the television programming may be forwarded back to the central location 102 for capture and storage. The viewer appliance 120 may also capture and store these commands for redundancy. Furthermore, user commands relative to the television programming coming from the alternative network 130 may be captured and stored in the viewer appliance 120 if the alternative network 130 is a one-way network and/or the alternative content source 128 lacks the ability to capture and store user commands.

For user commands that are captured and stored within the viewer appliance 120, the commands may be stored with a time stamp as to when they are received and may also be stored with additional information such as the end result of execution of the command, e.g., "on channel 3." These clickstream captures are held until a pre-determined time, and at that time, the set of clickstream data that has been captured and stored over the preceding period is then transferred as a data set back to a marketing information system ("MKIS") 114. The MKIS 114 is interfaced to the two-way network 116 such that user commands are directed to the MKIS 114 where they are stored in storage 115 of the MKIS 114 and are matched with the viewer profile information for the viewer who sent the user command. As discussed below, matching the user command data at the MKIS 114 allows for additional downstream processing to occur that enables statistics such as those based on demographics to be determined about television viewing behaviors.

Rather than forwarding the captured set of clickstream data back to the central location 102 through the distribution network 116, the viewer appliance 120 may be provided an alternative route to forward the captured set of clickstream data. For example, the distribution network 116 may only be a one-way network or the destination for the user commands may be other than the central location 102. Thus, the viewer appliance 120 may be provided with a connection to an alternative data network 124 which interconnects an MKIS 114' to the viewer appliance 120. For example, the viewer appliance 120 may be connected to a digital subscriber line ("DSL") or other broadband connection, a public switched telephone network ("PSTN"), wireless, etc., that leads to the network 124. Thus, when the time comes for the viewer appliance 120 to forward the stored set of clickstream data, it is forwarded through the alternative network 124 to the MKIS 114' where it is stored in storage 115' and matched with viewer profile information.

For user commands that are captured remotely, the viewer appliance 120 may forward the user commands as they are received to an external location in various ways. For example, where the distribution network 116 is a two-way network, the user command may be transferred over the network 116 back to the central location 102. The destination for the user command in this example is the MKIS 114.

Typically, the MKIS 114 stores the user commands coming from a particular viewer premises 118 in association with an identifier of the viewer such that the MKIS 114 matches the user command to a profile for the viewer, such as the demographical categories of the viewer. Also, the MKIS knows the context in which the user command is received due to the MKIS 114 storing a time stamp for when the user command is received and also having stored the preceding user commands. Accordingly, downstream processing can determine behaviors of TV viewers relative to the content being provided based on knowing when a user command or stream of user commands (i.e., a clickstream) is received relative to what content is being shown on a particular channel at that particular time. Thus, one can determine that a television viewer switches from one program to another, switches the channel during commercials, mutes the television when certain content is present, etc. Furthermore, an analyst may match these behaviors statistically with the various demographic categories known for the viewers. This same process is also applicable to the set of clickstream data that has been captured and stored by the viewer appliance 120 that is periodically transferred as a set to the MKIS 114 as discussed above.

Rather than forwarding the user commands as they are received back to the central location 102 through the distribution network 116, the viewer appliance 120 may be provided an alternative route to forward the user commands. For example, the distribution network 116 may only be a one-way network or the destination for the user commands may be other than the central location 102. Thus, the viewer appliance 120 may be provided a connection to an alternative data network 124 which interconnects an MKIS 114' to the viewer appliance 120. For example, the viewer appliance 120 may be connected to a digital subscriber line ("DSL") or other broadband connection, through to network 124. Thus, when the viewer appliance 120 receives the user command, it is forwarded through the alternative network 124 to the MKIS 114' where it is captured from the stream of communication and is stored in storage 115' as described above.

Figure 2:
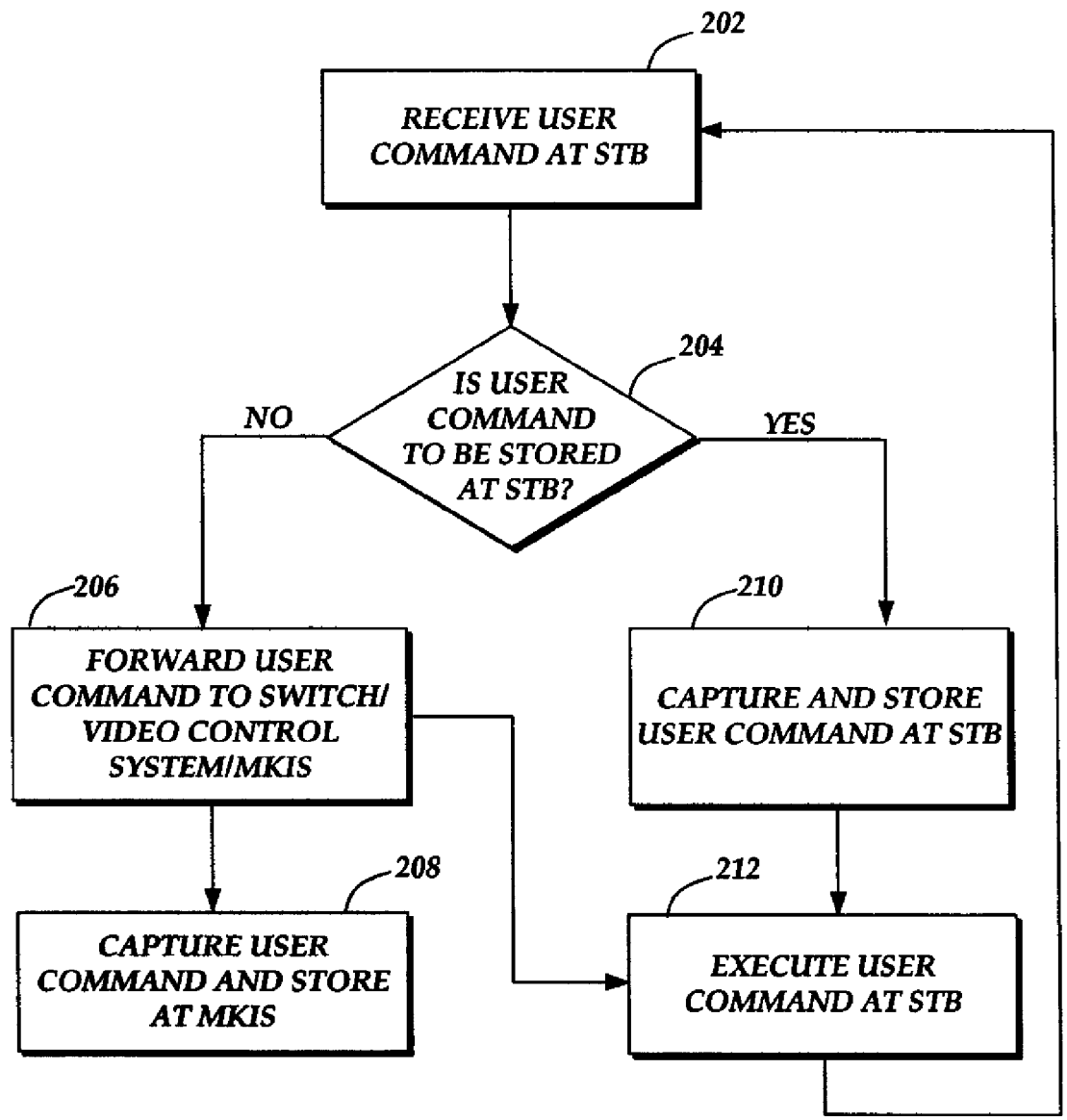
FIG. 2 shows an illustrative set of logical operations within the system of FIG. 1 for implementing embodiments of the present invention where clickstream capture occurs locally and remotely and user commands are executed locally.

FIG. 2 shows the logical operations performed within the system of FIG. 1 to capture the user commands at a location remote from viewer premises 118, such as at the MKIS 114. Initially, the user command is received at the viewer appliance 120 at reception operation 202. As described above, this may be from the viewer entering a command through a remote control or by entering the command directly on the viewer appliance 120. Then at query operation 204, the viewer appliance 120 detects whether this is a user command that is to be stored at the viewer appliance 120, such as by performing a look-up or as an automatic function of the user command. For example, this may be a user command that is to be stored at both the viewer appliance 120 and in the television network of the central location 102. As another example, this may be a user command relative to an alternative content source 128, where the alternative content source 128 lacks the ability to capture and store the user commands such that the viewer appliance 120 must capture and store them to preserve them for future uses.

Upon detecting that the user command is not to be stored at the viewer appliance 120, the viewer appliance 120 proceeds by forwarding the user command to the MKIS 114 at forward operation 206. It should be noted that additional discussion of FIG. 2, in particular forward operation 206, will also be provided below with reference to the system of FIG. 3, which introduces a switch 316 and a video control system 318 that may also be relevant to the forward operation 206. Upon the MKIS 114 receiving the forwarded user command information, the user command is captured and stored as appropriate for future processing at capture operation 208. Also upon receiving the user command, the viewer appliance 120 executes the user command to alter the aspects of the television programming at execution operation 212. While forward operation 206 and execution operation 212 are shown to occur in series, it will be appreciated that the viewer appliance 120 may perform these two operations in parallel such that there is no perceived delay by the viewer in entering the command and seeing the result of its execution.

Upon detecting that the user command is to be stored at the viewer appliance 120 at query operation 204, the viewer appliance 120 captures and stores the user command at capture operation 210. The viewer appliance 120 also executes the user command to control the aspect of the television programming as desired by the viewer, such as changing a channel or controlling the volume at execution operation 212. While capture operation 206 and execution operation 212 are also shown to occur in series, it will be appreciated that the viewer appliance 120 may also perform these two operations in parallel such that there is no perceived delay by the viewer in entering the command and seeing the result of its execution.

Figure 3:
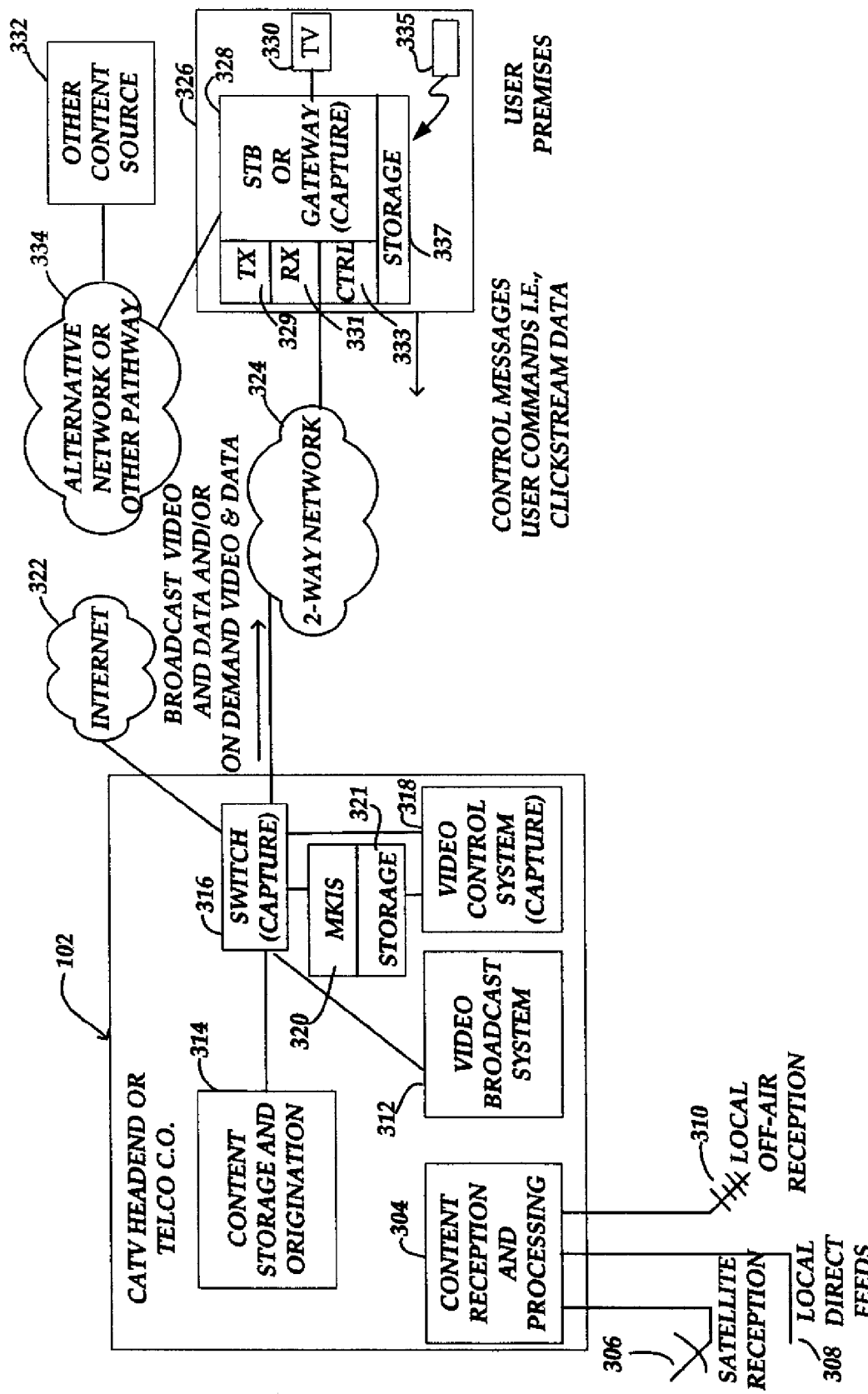
FIG. 3 shows an illustrative clickstream capture system architecture for implementing embodiments of the present invention where at least a portion of the television programming is switched within the television network such that the television network executes user commands while some clickstream capture is performed locally and other clickstream capture is performed remotely from the viewer premises.

FIG. 3 shows another example of a system for capturing the clickstreams, but in this example the television programming that is being provided to the viewer includes at least video-on-demand. In the video-on-demand system, the streams of programming to be sent to the viewer are switched within the television network of central location 302 such that only one of the streams is being sent through a network 324 to a viewer appliance 328. The system of FIG. 3 may also but not necessarily include broadcasted programming where multiple streams are being provided to and selected by the viewer appliance 328 as discussed above in relation to FIG. 1. The video-on-demand and broadcast television programming is provided to viewers from a central location 302.

The central location 302 of this example includes various components for receiving the television programming to be provided to the television viewers. Again, much of the television programming originates from a satellite reception via a satellite receiver dish 306. Additional direct local feeds 308 receive direct transmission via a wireline link to local television stations. Also, additional local off-air reception via antennas 310 may also receive local programming that is not otherwise received through the direct local feeds 308.

These programming sources provide received programming to a content reception and processing system 304. This system 304 takes the various channels of television programming being received and creates a channel line-up. The content reception and processing system 304 receives a particular stream of programming and assigns it to a particular channel within the channel line-up.

The content reception and processing system 304 provides the individual streams of programming to a video broadcast system 312. The video broadcast system 312 then broadcasts each of the streams of programming within its assigned channel of the channel line-up. The video broadcast system 312 broadcasts these channels, as well as data such as guide data, to a switch 316 at the central location 302. This switch 316 then switches between the various sources of programming to provide a particular stream of programming through the distribution network 324 to viewer premises 326 according to a selection by a viewer.

In addition to receiving the broadcasted channel line-up from the video broadcast system 312, the switch 316 may receive television programming content from various other sources as well. For example, the switch 316 may receive content from a content storage and origination system 314. The content storage and origination system 314 may provide video-on-demand programming such as movies and other programming that viewers may want to watch at any given time such that content is stored and can be selected for playback to the viewer at any time the viewer requests. Such video-on-demand services are often provided on a fee per use basis or monthly fee basis. The switch 316 may also receive content through the Internet 322 from a source of television programming content and may provide television programming as well as data services to the end viewer through the distribution network 324.

A video control system 318 is included at the central location 302 to provide additional intelligence for operation of the switch 316. The switch 316 receives user commands for the changing from one stream to send to the viewer appliance 328 to another. The switch 316 may select one stream or another, such as those streams from the video broadcast system 312, without further assistance. However, certain channels of the video broadcast system 312 or content from the content and storage origination system 314 may be controlled on an account basis. The video control system 318 verifies that a particular viewer requesting a given channel or content has authorization to receive that channel or content and controls the switch 316 to either provide the channel/content or not provide the channel/content.

The streams being provided to viewer premises 326 may be either in an analog or a digital format. The network 324 may carry either format or both formats, such as where one set of channels of the channel line-up being received by the switch 316 are broadcast as analog while another set of channels of the channel line-up are digital. Additionally, the network 116 carries two-way communications such that communications are provided back to the switch 316 of the central location 302 from viewer premises 326 such that the switch 316 can select the particular stream to provide back through the network 324 to viewer premises 326.

In addition, there may be alternative sources of television programming to the viewer appliance 328 at viewer premises 326. An alternative source of content 332 may be provided to the viewer through an alternative network 334 such as a digital satellite connection, a digital off-air reception, etc. as discussed above in relation to FIG. 1. Thus, the viewer may select from various sources of content when providing user commands, and these user commands are captured for later processing in the system of FIG. 3.

At viewer premises 326, the incoming stream of channels is provided to a viewer appliance 328. The viewer appliance 328 allows a viewer to provide commands to control aspects of the television programming being viewed on the television 330, such as channel changes and/or additional aspects such as audio format and volume control.

When a viewer is watching television, the viewer continues to provide user commands to control the aspects of television programming as desired. Again, the viewer may provide a user command by pressing buttons on a remote control 335 that provides a corresponding signal to the viewer appliance 328 that is received by a reception module 331. Alternatively, the viewer may provide a user command by pressing buttons located on the viewer appliance 328 itself. As the command that is relevant to the content being provided from the central location 302 is received, the viewer appliance 328 forwards the user command (i.e., a control message) back to the switch 316 at the central location 302 through a transfer module 329 rather than merely storing a record of it in storage 337 for future transfer. Where the command is a change to a new stream of programming, then the switch 316 and video control system 318 executes the command to begin providing a different stream, rather than the viewer appliance 328 executing the change. Where the user command is other than a channel change, such as a selection of audio format or volume, then the viewer appliance 328 also executes the command through a control module 333.

For the situation where the user command is not executed within the central location 302, such as for a volume change or for a user command relevant to an alternative source of content 332, then the user command may not be forwarded to the central location 302 since the central location 302 will not execute it. However, to prevent this user command from being lost, the viewer appliance 328 may capture and store this user command along with contextual information such as time received and then at a pre-determined time in storage 337, and subsequently forward the collection of stored user commands to an MKIS 320 such as over the two-way network 324 or over an alternative network interconnected to the same or different MKIS 320.

Once a user command that has been forwarded from the viewer appliance 328 is received at the switch 316, it may be captured by the video control system 318 or the switch 316 from the stream of information being received from the network 324. The MKIS 320 is interfaced to the switch 316 and video control system 318 such that the user command is then passed to the MKIS 320 where it is stored in storage 321 in association with the contextual information that has been matched with the user command at the video control system 318, such as the identifier of the viewer who generated the command, the time at which the viewer appliance 328, switch 316, or video control system 318 received the user command, etc. Additionally, the video control system 318 may also match the user command being forwarded to the MKIS 310 with a result of the user command or may only forward the result. For example, the user command may be a channel up button, whose result is a change from channel 2 to channel 3 such that the video control system 318 forwards an "on channel 3" result to the MKIS 320 for storage.

The viewer appliance 328 may also forward the user command as it received to an external location in other ways. For example, in systems where the MKIS 320 is not interfaced to the switch 316 and/or video control system 318, the MKIS 320 may be accessed through alternative network as described above in relation to FIG. 1. The viewer appliance 328 may be provided a connection to such an alternative data network which interconnects an MKIS 320 to the viewer appliance 328. Like in the example of FIG. 1, the viewer appliance 328 may be connected to a digital subscriber line ("DSL") or other broadband connection. When the viewer appliance 328 receives the user command, it is forwarded back through the network 324 for execution while it is simultaneously forwarded through the alternative network to the MKIS 320 where it is captured from the stream of communication and is stored as described above.

Returning to FIG. 2, these logical operations may be performed within the system of FIG. 3 for situations where the viewer appliance 328 will execute the user commands and the viewer appliance 328 and/or the central location will capture and store the user commands. For example, the switch 316 of FIG. 3 may pass multiple broadcasted channels to the viewer appliance 328 at a time to allow the viewer appliance 328 to select the particular stream that the viewer is interested in watching. The system may be configured so that the network records such channel changes by the viewer appliance 328, but the viewer appliance 328 records other user commands it executes such as volume changes. In this situation, once the user command is passed to the switch 16 or video control system 318 at forward operation 206, the user command is then passed on to the MKIS 320 for capture and storage at capture operation 208 without the switch 316 or video control system 318 executing the user command which has already been executed in the viewer appliance 328.

Figure 4:
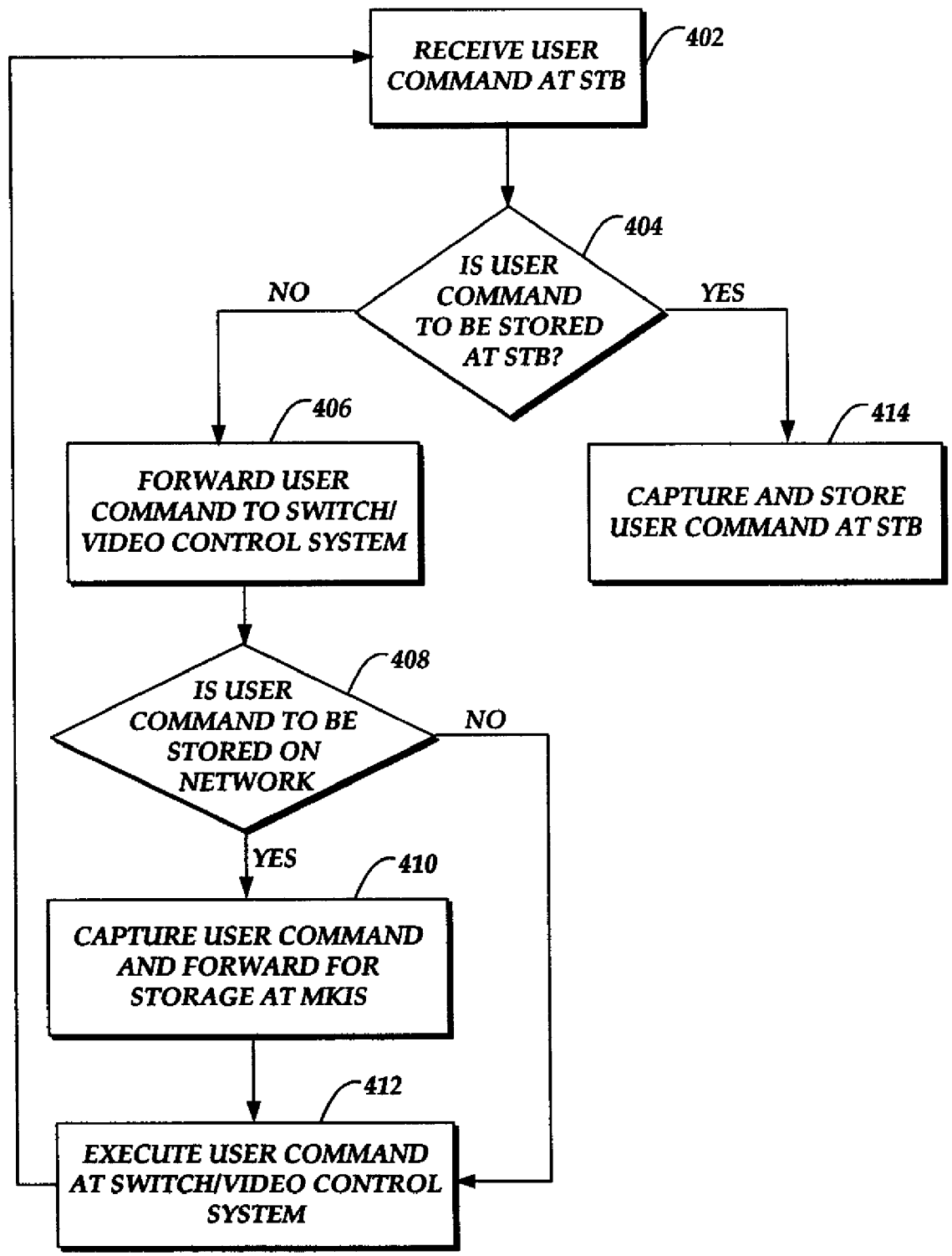
FIG. 4 shows an illustrative set of logical operations within the system of FIG. 3 for implementing embodiments of the present invention where some clickstream capture occurs locally and some occurs remotely and user commands are executed remotely.

FIG. 4 shows the logical operations that may be performed within the system of FIG. 3 where all user commands being received at the viewer appliance 328 are executed within the television network of the central location 302. The logical operations begin with the viewer appliance 328 receiving the user command at reception operation 402. Then, the viewer appliance 328 detects at query operation 404 whether the viewer appliance 328 is to capture and store this command, such as by a look-up or by an automatic function of the user command. For example, although the central location 302 is going to execute the user command, it may be a less significant user command such that the central location 302 does not capture and store it so that the viewer appliance 328 must capture and store it to preserve it. Alternatively, the central location 302 may also capture and store it but it is desired to capture and store it within the viewer appliance 328 for redundancy.

Upon detecting that the user command is not to be stored at the viewer appliance 328, then the viewer appliance 328 forwards the user command to the switch 316 and video control system 318 at forward operation 406. The switch 316 and video control system 318 then detects at query operation 408 whether the user command is to be captured and stored within the central location 302, again by a look-up or as an automatic function of the user command. Query operation 408 may be complementary to query operation 404 such that those commands captured and stored by the viewer appliance 328 are not stored by the central location 302 but those commands not captured and stored by the viewer appliance 328 are captured and stored by the central location 302. However, the system may be configured otherwise where some of those captured and stored at the viewer appliance 328 are also captured and stored in the central location 302.

Upon detecting that the user command is to be stored on the central location 302, then the user command is captured at the switch 316 or video control system 318 and forwarded for storage to MKIS 320 at capture operation 410. Also, the switch 316 or video control system 318 executes the user command at execution operation 412, either in series or in parallel with capture operation 410. When the viewer appliance 328 detects at query operation 408 that the user command is not to be stored within the central location 302, then operational flow proceeds directly to execution operation 412 where the user command is executed.

Upon the viewer appliance 328 detecting at query operation 404 that the user command is to be stored within the viewer appliance 328, then operational flow proceeds to capture operation 414. Here, the viewer appliance 328 captures and stores the user command, along with the related contextual information such as time of reception. Also, operational flow returns to forward operation 406 where the user command is forwarded to the switch 316 or video control system 318.

Figure 5:
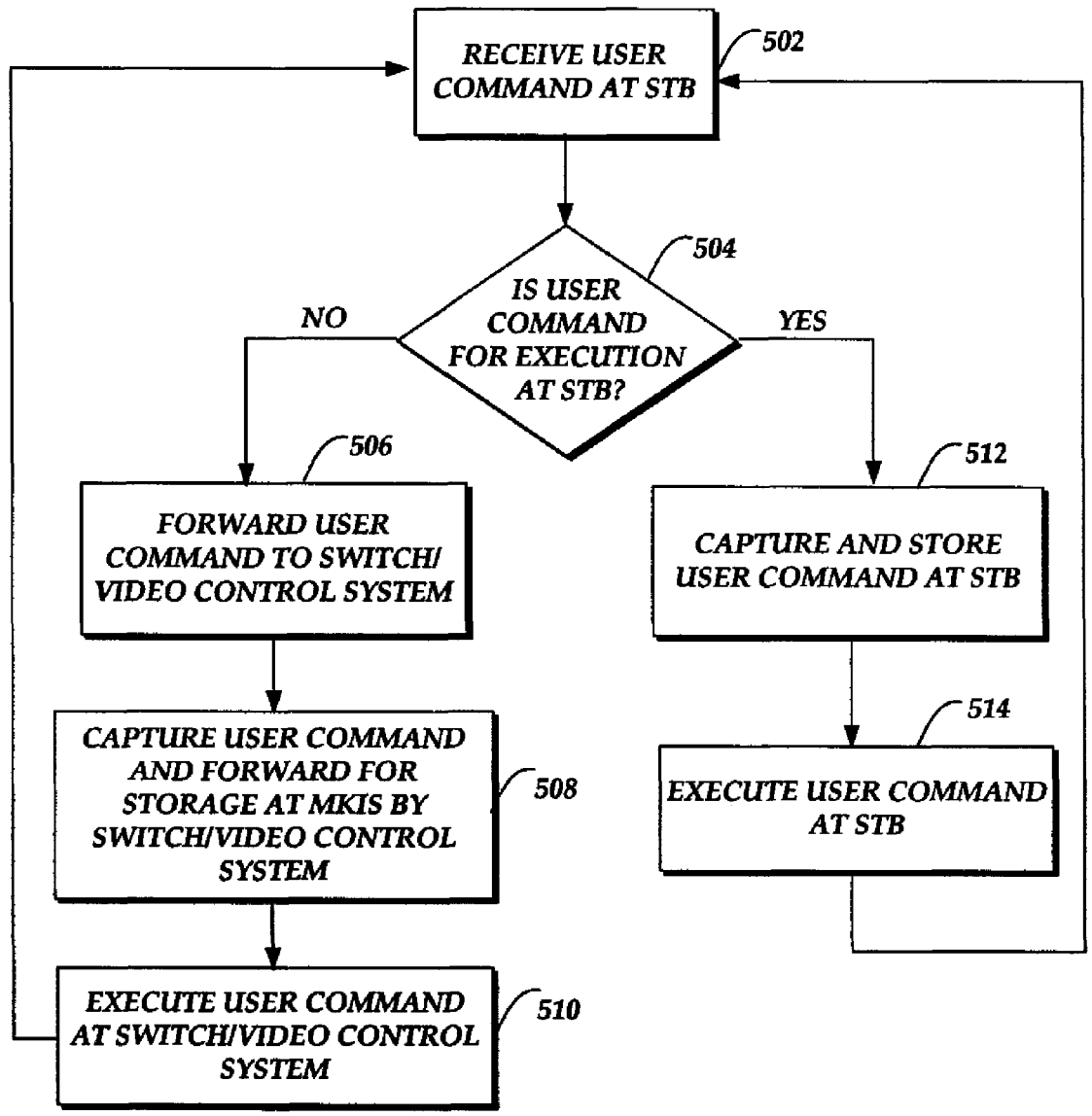
FIG. 5 shows an illustrative set of logical operations within the system of FIG. 3 for implementing embodiments of the present invention where clickstream capture is performed locally and remotely and some user commands are executed locally and some are executed remotely.

FIG. 5 shows illustrative logical operations for utilizing the capture and store functions of the viewer appliance 328 for user commands that the viewer appliance 328 executes while utilizing the capture and store functions of the central location 302 for user commands that the central location 302 executes within the system of FIG. 3. The logical operations begin at reception operation 502 where the viewer appliance 328 receives the user command. Then, at query operation 504, the viewer appliance 328 detects whether the received command is a command that the viewer appliance 328 executes, such as by a look-up or by an automatic function of the user command. For example, certain channel changes may be executed in the central location 302 while other channel changes or volume changes are executed at the viewer appliance 328.

Upon detecting that the user command is not for execution at the viewer appliance 328, the viewer appliance 328 forwards the user command to the switch 316 or video control system 318 at forward operation 506. The switch 316 or video control system 318 captures the user command and forwards it to the MKIS 320 along with contextual information and/or results of execution at forward operation 508. Also, at execution operation 510, the switch 316 or video control system 318 executes the user command to control an aspect of the television programming such as changing the channel being provided to viewer premises 326. As previously noted with regard to FIG. 4, forward operation 508 and execution operation 510 may be performed in series as shown or may be performed in parallel to eliminate any delay in providing the result of the command to the viewer.

Upon detecting that the user command is for execution at the viewer appliance 328, the viewer appliance 328 captures and stores the user command at capture operation 512. The viewer appliance 328 also executes the user command at execution operation 514, which may be performed in series or in parallel with capture operation 512.

Figure 6:
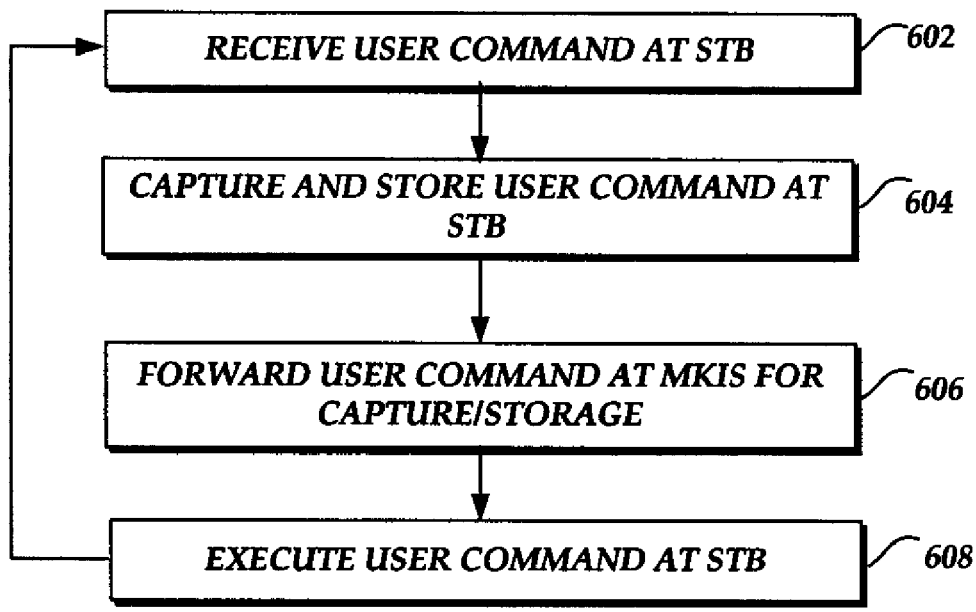
FIG. 6 shows an illustrative set of logical operations within the system of FIGS. 1 and 3 for implementing embodiments of the present invention where all clickstream capture occurs both locally and remotely and execution of user commands occurs locally.

FIG. 6 shows an illustrative set of logical operations that may be performed within the systems of FIG. 1 or FIG. 3. Here, the user commands are all captured and stored at both the viewer appliance 328 and the central location 302, such as for redundancy, and are executed at the viewer appliance 328. The logical operations begin at reception operation 602 where the viewer appliance 328 receives the user command. The viewer appliance 328 then captures and stores the user command at capture operation 604 and forwards the user command to the MKIS 320 for capture and storage at forward operation 606. The viewer appliance 328 also executes the command at execution operation 608 which may be performed in series or in parallel with forward operation 606.

Figure 7:
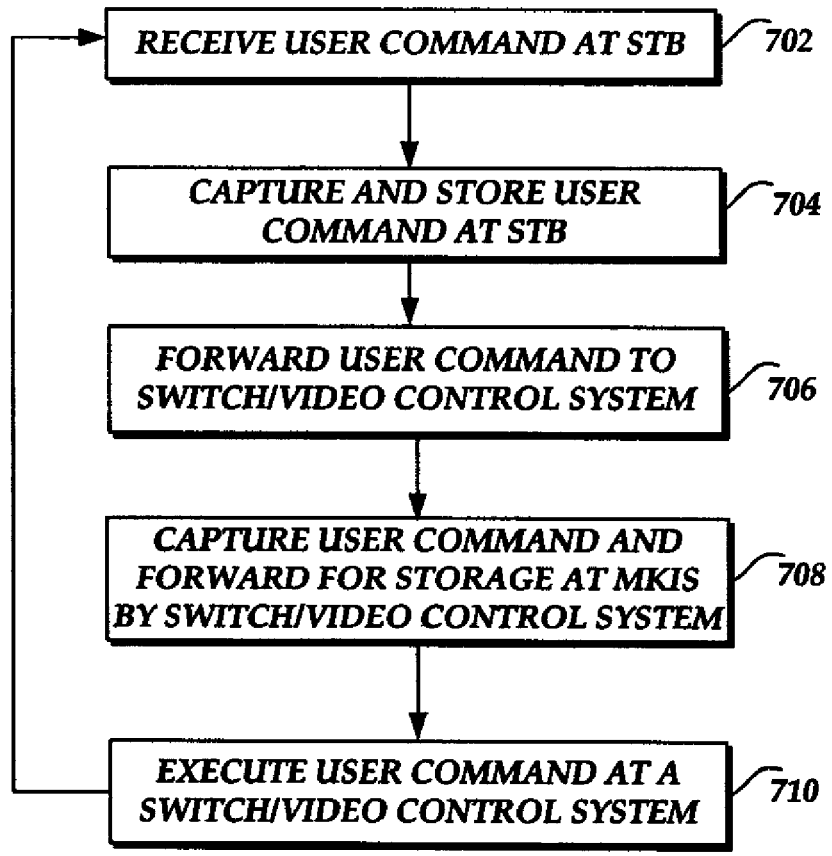
FIG. 7 shows an illustrative set of logical operations within the system of FIG. 3 for implementing embodiments of the present invention where all clickstream capture occurs both locally and remotely and execution of user commands occurs remotely.

FIG. 7 shows an illustrative set of logical operations that may be performed within the system of FIG. 3. Here, the user commands are all captured and stored at both the viewer appliance 328 and the central location 302, such as for redundancy, and are executed within the central location 302. The logical operations begin at reception operation 702 where the viewer appliance 328 receives the user command. The viewer appliance 328 then captures and stores the user command at capture operation 704 and forwards the user command to the switch 316 or video control system 318 for capture and storage at forward operation 706. The switch 316 or video control system 318 captures the user command and forwards it to the MKIS 320 for storage at capture operation 708. The switch 316 or video control system 318 also executes the command at execution operation 710 which may be performed in series or in parallel with capture operation 708.

Figure 8:
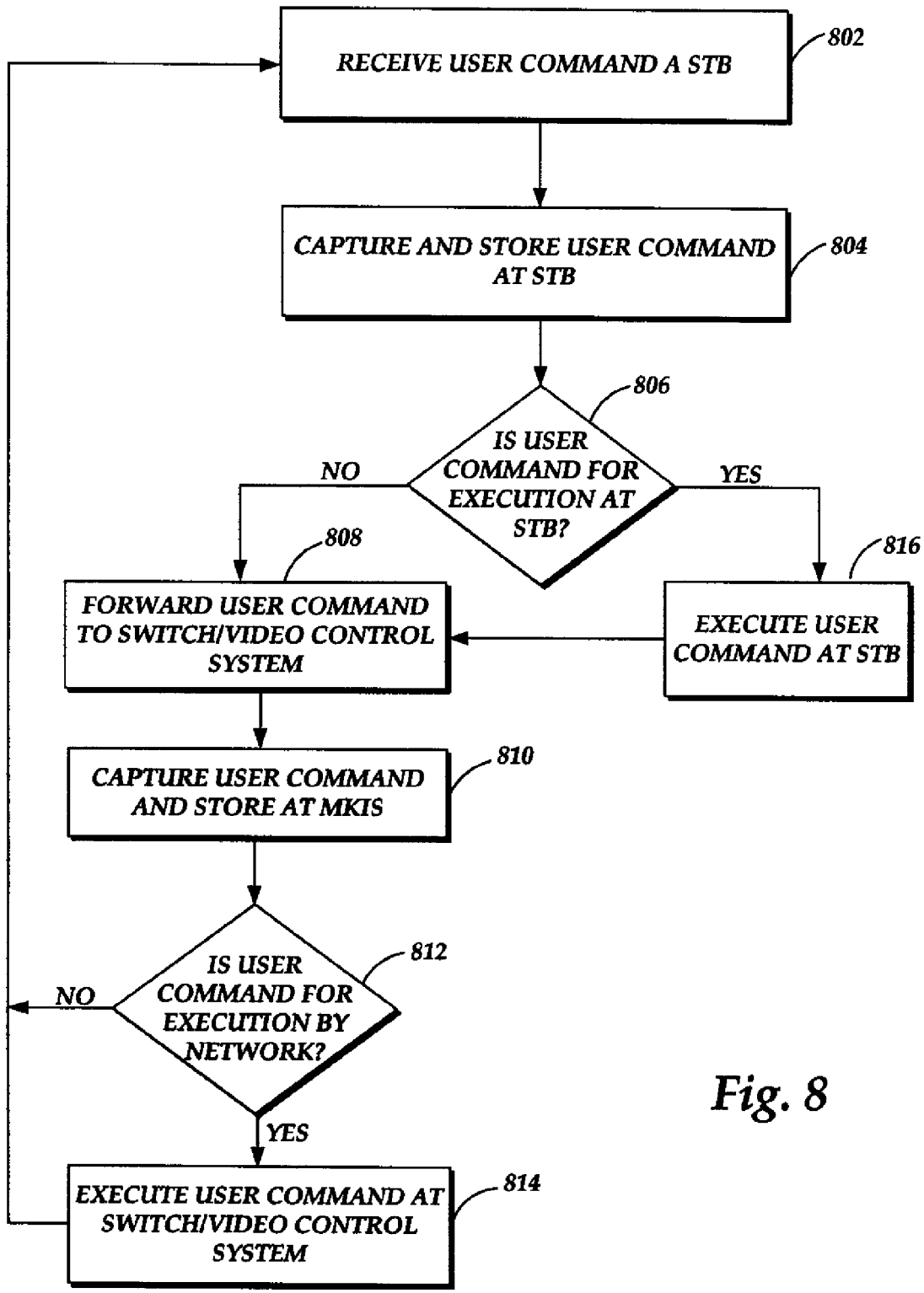
FIG. 8 shows an illustrative set of logical operations within the system of FIG. 3 for implementing embodiments of the present invention where all clickstream capture occurs both locally and remotely and execution of some user commands occurs locally and execution of some user commands occurs remotely.

FIG. 8 shows an illustrative set of logical operations that may be performed within the system of FIG. 3. Here, the user commands are all captured and stored at both the viewer appliance 328 and the central location 302, and some of the user commands are executed at the viewer appliance 328 while others are executed within the central location 302. The logical operations begin at reception operation 802 where the viewer appliance 328 receives the user command. The viewer appliance 328 then captures and stores the user command at capture operation 804 and determines at query operation 806 whether the command is for execution at the viewer appliance 328.

Upon detecting that the command is not for execution at the viewer appliance 328, the viewer appliance 328 forwards the user command to the switch 316 or video control system 318 at forward operation 808. The switch 316 or video control system 318 captures the user command and forwards it to the MKIS 320 for storage at capture operation 810. The switch 316 or video control system 318 also detects at query operation 812 whether the user command is for execution by the switch 316 or video control system 318.

Query operation 812 may be complementary to query operation 804 such that those commands not to be executed by the viewer appliance 328 are to be executed by the central location 302 while those commands that are to be executed by the viewer appliance 328 are not to be executed by the central location 302. However, the system may also be configured such that there are user commands that may be executed within the viewer appliance 328 and within the central location 302. For instance, one scenario may be that the central location 302 executes the command by providing a new stream of programming to the viewer appliance 328, and the viewer appliance 328 executes the same user command by changing to a new input or channel to receive the new stream of programming.

Upon the switch 316 or video control system 318 detecting at query operation 812 that the user command is to be executed by the central location 302, then the switch 316 or video control system 318 executes the command at execution operation 814. Upon detecting that the user command is not to be executed by the central location 302, then the process ends with respect to the current user command and waits for the next user command at reception operation 802. While capture operation 810 is shown in series with query operation 812 and execution operation 814, these operations may also be performed in parallel to eliminate any delay in providing the result of execution to the viewer.

When the viewer appliance 328 detects at query operation 806 that the user command is for execution at the viewer appliance 328, then operational flow proceeds to execution operation 816 where the viewer appliance 328 executes the user command. Then, operational flow proceeds to forward operation 808 and continues as described above.

Thus, the embodiments of clickstream capture provide for the collaborative capture and storage of the user command between the viewer appliance and an external location. This eliminates that requirement that the viewer appliance or central location capture and store all user commands, but all user commands may be captured and stored at both locations for redundancy. As an advantage of performing clickstream capture collaboratively between the viewer appliance and an external location, those user commands being executed at one location may be captured and stored there while those commands being executed at another location may be captured and stored there, or some combination. As the external location typically has much greater capacity than an individual viewer appliance, the external location may store all user commands while the user commands to be captured and stored at the viewer appliance are filtered so that only those of significance are stored. For any clickstream capture that occurs at the viewer appliance, the clickstream data set may then be periodically forwarded to a downstream location for processing in conjunction with the clickstream data that has been captured and stored in the central location of the television network or other external location.

The data that has been stored in the MKIS of the embodiments discussed above may then be used for various purposes. It may be used to target advertising for particular times and television programs. It may also be used to determine the proper characteristics for advertisements such as length and content. Furthermore, the data may be used to determine the proper television programming to provide at any given time.

Accordingly, the data that is obtained has significant value in relation to making determinations about what content is provided for television viewers. Usage of this data for such purposes is discussed in more detail in U.S. application Ser. No. 09/467,889, filed on Dec. 21, 1999, and entitled METHOD AND SYSTEM FOR PROVIDING TARGETED ADVERTISEMENTS.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of capturing user commands, comprising:
   receiving a user command at a viewer appliance;
   performing a look-up to determine if local storage is required;
   when the look-up determines that local storage is required, then capturing and locally storing the user command and executing the user command at the viewer appliance; and
   when the look-up determines that redundant storage is required, then storing the user command in memory of the viewer appliance and forwarding the user command to a remote location for redundant storage in a network.

2. The method according to claim 1, further comprising forwarding the user command from the viewer appliance when remote storage is determined.

3. The method according to claim 1, further comprising forwarding information related to the user command to the remote location.

4. The method according to claim 1, further comprising time stamping the user command.

5. The method according to claim 1, further comprising storing a result of the user command.

6. The method according to claim 1, further comprising determining whether the user command occurred while receiving programming from a one-way network or a two-way network.

7. The method according to claim 6, further comprising locally storing the user command in the memory of the viewer appliance when the user command occurred while receiving programming from the one-way network.

8. A system for capturing user commands, comprising:
   a reception mechanism receiving a user command at a viewer appliance;
   a transfer mechanism performing a look-up to determine a storage location for the user command;
   when the transfer mechanism determines that redundant storage is required, then the reception mechanism captures and locally stores the user command for execution at the viewer appliance and forwards the user command to a remote location for redundant, remote storage in a network.

9. The system according to claim 8, wherein the transfer mechanism forwards the user command from the viewer's appliance when the remote storage is determined.

10. The system according to claim 8, wherein the transfer mechanism forwards information related to the user command to the remote location.

11. The system according to claim 8, wherein the reception mechanism time stamps the user command.

12. The system according to claim 8, wherein the transfer mechanism forwards the user command at a predetermined time.

13. The system according to claim 8, wherein the reception mechanism determines whether the user command occurred while receiving programming from a one-way network or a two-way network.

14. The system according to claim 13, wherein the reception mechanism locally stores the user command in the memory of the viewer appliance when the user command occurred while receiving programming from the one-way network.

15. A method of capturing user commands, comprising:
   receiving a user command at a video switch that was forwarded from a viewer appliance;
   determining by the video switch whether the user command is to be remotely stored at a network location;
   when remote storage is determined, then capturing and forwarding the user command to the network location; and
   when remote storage is not determined, then declining network storage and executing the user command at the video switch.

16. The method according to claim 15, further comprising receiving information related to the user command that was also forwarded from the viewer appliance.

17. The method according to claim 15, further comprising determining whether the user command occurred while the viewer appliance received programming from a one-way network or a two-way network.

18. The method according to claim 17, further comprising remotely storing the user command at the network location when the user command occurred while receiving programming from the one-way network.

19. The method according to claim 15, further comprising matching the user command to a profile.

20. The method according to claim 15, further comprising receiving and storing a time stamp associated with the user command.

* * * * *